May 10, 1949.  N. TARNOW  2,469,938

CABLE CLAMP

Filed Sept. 10, 1947

INVENTOR.
Nathan Tarnow
BY Daniel G. Cullen
Attorney

Patented May 10, 1949

2,469,938

UNITED STATES PATENT OFFICE 2,469,938

CABLE CLAMP

Nathan Tarnow, Detroit, Mich., assignor to Charles E. Lifka, doing business as Tomic Sales and Engineering Company, Detroit, Mich.

Application September 10, 1947, Serial No. 773,151

1 Claim. (Cl. 285—47.3)

This application relates to cable clamps and more particularly, for clamping armored cables to surfaces having holes through which the cables pass. Such clamps are useful for clamping armored electrical conductors to junction boxes through knockout holes of which the conductors enter the boxes.

The cable clamp herein disclosed is characterized by its extreme simplicity and economy of manufacture, by the ease with which it is used by the installing electrician, and by its special adaptability for use with armored cables.

For an understanding of the clamp herein disclosed, reference should be had to the accompanying drawing.

In this drawing.

Figure 1:
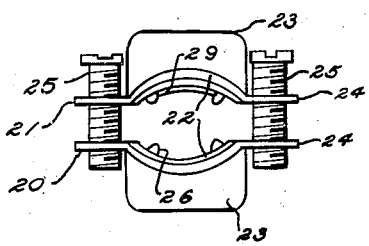
Fig. 1 is a front view of the clamp per se.
Figure 4:
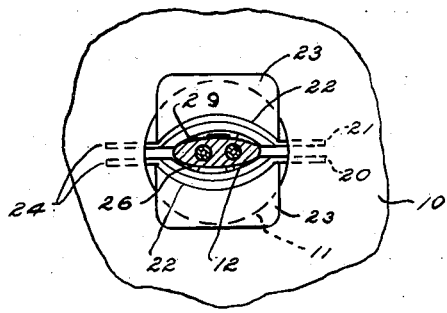
Fig. 4 is a back view of the clamp.

In the foregoing drawing, there is shown diagrammatically at 10 a surface or box wall having a hole 11 through which may be passed an armored cable 12. The surface may be the wall of a conventional junction box and the hole 11 may be a conventional knock-out hole and the cable 12 may be a conventional multiple conductor armored cable which is to be clamped to the surface 10 as it passes through the hole 11.

The clamp consists of two similar complementary halves or sections 20—21 with each half being in the form of an angularly bent sheet metal piece, including a base or body portion 22 and a back or flange portion 23. The base or body portions have their centers curved to fit closely around a cable and also have ears or wings 24 on their ends.

Screws 25 pass through clear slotted holes of the wings 24 of the upper half of the clamp and thread through tapped holes in the wings 24 of the lower half of the clamp for adjustably connecting the adjacent wings of the complementary halves to clamp them together around a cable.

Figure 2:
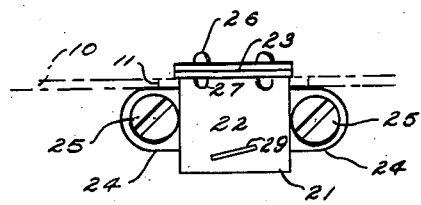
Fig. 2 is a view as if looking downwardly from Fig. 1, showing the top half of the clamp only.

It will be observed that the back portions 23 are spaced from the wings 24, as best shown in Fig. 2, to permit the surface 10 to be disposed in front of the back portions 23 and in back of the wings 24, when the clamp is disposed in the hole 11 of the surface 10 and clamped to a cable 12.

Figure 3:
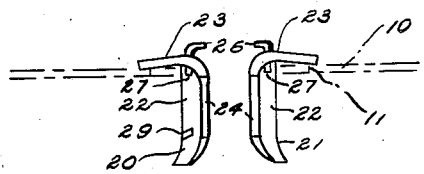
Fig. 3 is a view as if looking from the left of Fig. 2.

It will also be observed that the back portions 23 are not exactly at right angles with respect to the base portion 22, but rather that the angles between these portions are a few degrees short of 90°, as best shown in Fig. 3, whereby adjustment of the connecting means 25 moves the back portions towards the surface 10 for tight and frictional engagement between the back portions 23 and the surface 10, rocking the halves so that the extremities of back portions 23 first engage the back of surface 10.

It will also be observed that two pairs of stops 26 are formed out of four slots 27 of the base portions 22 to project towards one another and thus engage or stop the end of the armor of a cable from entering the box or passing beyond surface 10, though permitting the conductors of the cable within the armor to project beyond these stops.

It will also be observed that the back portions are so proportioned with respect to the hole 11 that they can be entered through said hole from the front of the surface even when the halves of the clamps are loosely connected by the screws 25, provided, however, that the cable 12 is not within the clamp.

At 29 is shown a bump for biting into the cable to aid in clamping it in place.

Now having described the clamp herein disclosed, reference should be had to the claim which follows.

I claim:

In a cable clamp for clamping a cable to a surface having a hole through which the cable passes, said cable clamp consisting of two similar complementary halves, each half being in the form of an angularly bent sheet metal piece, including a base portion and a back portion, each base portion having its center part curved to fit closely around a cable, and having apertured wings on its ends, the back portions being spaced axially from said wings sufficiently to permit said surface to be disposed in front of said back portions and in back of said wings, and two screw bolts connecting the pairs of adjacent wings of the complementary halves to clamp them together around a cable, with the base portions in front of said surface, the back portions being so proportioned with respect to said hole that they can be entered through said hole, without the cable in the clamp, from the front of said surface, even when the halves of the clamp are interconnected by the bolts, the improvement which consists in making the angle between the base portion and the back portion of each half being slightly less than 90°, whereby tightening of the bolts when the halves are around a cable rocks the halves so that their extremities first engage the back of said surface and the halves are held tightly against said surface, and stops formed from said halves or sections to project into the space between said base or body portions to engage and stop the end of an armor of an armored cable, while permitting the conductors thereof to pass said stops said stops being in the form of two pairs of lugs, disposed at the intersections of the bases and backs of the halves, one pair for each of the halves, with the lugs of each pair being relatively spaced laterally, and with all the lugs projecting rearwardly from the back portions and inwardly from the base portions.

NATHAN TARNOW.

REFERENCES CITED

The following references are of record in the file of this patent:

UNITED STATES PATENTS

| Number | Name | Date |
| --- | --- | --- |
| 1,794,505 | Anderson | Mar. 3, 1931 |
| 2,419,426 | Tarnow | Apr. 22, 1947 |